United States Patent [19]
Ichibangase et al.

[11] Patent Number: 5,287,389
[45] Date of Patent: Feb. 15, 1994

[54] FRAME ALIGNMENT CIRCUIT

[75] Inventors: Hiroshi Ichibangase; Kiwami Matsushita, both of Kamakura, Japan

[73] Assignee: Mitsubishi Denki Kabushiki Kaisha, Tokyo, Japan

[21] Appl. No.: 765,149

[22] Filed: Sep. 25, 1991

[30] Foreign Application Priority Data

Oct. 15, 1990 [JP] Japan .................................. 2-275980

[51] Int. Cl.[5] ............................ H04J 3/06; H04L 7/08
[52] U.S. Cl. .................................... 375/114; 375/106; 370/105.5; 328/63
[58] Field of Search ............... 375/106, 111, 114, 116; 370/105.1, 105.4, 105.5, 106; 328/63, 72; 307/269, 480

[56] References Cited

U.S. PATENT DOCUMENTS

| | | | |
|---|---|---|---|
| 4,698,806 | 10/1987 | Graves et al. | 370/105.4 |
| 4,788,681 | 11/1988 | Thomas et al. | 375/114 |
| 4,956,854 | 9/1990 | Bengtson | 375/111 |
| 4,965,884 | 10/1990 | Okura et al. | 370/105.1 |

FOREIGN PATENT DOCUMENTS 2-186850  6/1990  Japan .

*Primary Examiner*—Curtis Kuntz
*Assistant Examiner*—Young Tse
*Attorney, Agent, or Firm*—Wolf, Greenfield & Sacks

[57] ABSTRACT

A frame alignment circuit is disclosed which includes multi-stage dividing counters and multi-stage line demultiplexing circuits. The shift pulse for frame synchronizing is converted to the width of the first divided clock signal and applied to the first dividing counter. Accordingly, the frame synchronization is easily established by demultiplexing the high rate multiplexed coded signal even if the number of demultiplexing line is increased.

14 Claims, 4 Drawing Sheets

FRAME ALIGNMENT CIRCUIT

BACKGROUND OF THE INVENTION

1. Field of the Invention

The present invention relates generally to a frame alignment circuit and, more specifically, to a frame alignment circuit for a high speed digital transmission.

2. Description of the Prior Art

FIG. 3 show a block diagram of a prior art frame alignment circuit as disclosed in the Japanese laid-open publication No. 2-186850, by Tokkai (1990). In FIG. 3, frame alignment circuit comprises a bit synchronous circuit 1 regenerating a clock pulse from multiplex coded signal. The circuit also includes a line demultiplexing circuit 2, which generates a demultiplex pulse, a low rate demultiplexing line clock pulse, and a synchronous line selecting pulse. These three pulses are generated using the clock pulse which is regenerated in the bit synchronous circuit 1. The frame alignment circuit further includes a decoding circuit 3 for decoding the multiplexed coded signal and forwarding the decoded signal to respective line using the demultiplexed pulse generated in the line demultiplexing circuit 2. The frame alignment circuit has a second AND gate 4 which serves the function of synchronizing the timing between the synchronous line selecting pulse (which is generated by the line demultiplexing circuit 2) and the low rate demultiplexing line clock pulse. The frame alignment circuit further includes a first AND gate 5 which logically multiplies the data of the specified channel of the demultiplexed coded signal by the synchronous line selecting pulse, and a synchronous pattern generator 6, which generates a synchronous pattern using an output of the second AND gate 4. Lastly, the frame alignment circuit includes a mismatch circuit 7 for comparing an output of the AND gate 5 with an output of the synchronous pattern generator 6 to generate a shift pulse if the comparison reveals a mismatch.

FIG. 4 shows a detailed block diagram of the line demultiplexing circuit 2 of the prior art frame alignment circuit. In FIG. 4, the line demultiplexing circuit 2 comprises, D flip-flops 9a–9d. There as many flip-flops as there are multiplexed lines. The flip-flops 9a–9d are connected in cascade fashion. And also included in the circuit is a NOR gate 8 having its input terminals connected to the respected output of the D flip-flop 9a–9c, the output of the NOR gate 8 is connected to a D terminal of the D flip-flop 9a. The circuit 2 also has a demultiplexing line clock generating circuit 10 which generates a line clock by using the output of the D flip-flops 9a–9d. A counter circuit 11 is provided to output a synchronous line selecting pulse showing a position of the frame synchronous pulse by using the demultiplexing pulse generated in the demultiplexing line clock generating circuit 10.

The operation of the above conventional system is explained hereinafter.

In FIG. 3, the multiplexed coded signal is input to the bit synchronous circuit 1. The bit synchronous circuit 1 generates a clock pulse by bit synchronization. The clock pulse passes as input to the line demultiplexing circuit 2, and the line demultiplexing circuit 2 generates the demultiplexing pulse and an accompanying shift pulse. By using the demultiplexing pulse, the decoding circuit 3 converts the multiplexed coded signal to a parallel signal and demultiplexes the multiplexed coded signal to a number of line signal.

As shown in FIG. 4, the line demultiplexing circuit 2 generates the synchronous line selecting pulse (one bit width of the demultiplexing clock pulse) at the position of the frame synchronous pulse by the counter circuit 11. On the other hand, the second AND gate 4 (FIG. 3) synchronizes the synchronous line selecting pulse with the demultiplexing line clock and outputs a pulse to the synchronous pattern generator 6. The synchronous pattern generator 6 generates a synchronous pattern according to the output of the second AND gate 4. On the other hand, a first AND gate 5 logically multiplies the data of the specified channel of the demultiplexed coded signal by the synchronous line selecting pulse. The outputs of the first AND gate 5 and the output of the synchronous pattern generator 6 are compared in the mismatch circuit 7. The mismatch circuit 7 generates a shift pulse having a width of one bit width which is forwarded as input to line demultiplexing circuit 2 if the comparison results indicates a mismatch. When the shift pulse is input to the line demultiplexing circuit 2, the line demultiplexing circuit 2 shifts the demultiplexing pulse by one bit which is output to the decoding circuit 3. This shifting is repeated until the normal frame synchronous bit is at the proper position so that the synchronization is achieved.

In the demultiplexing circuit 2, the one bit shift is executed by applying the shift pulse to the reset terminal R of the D flip-flop 9c. Namely the one bit shift is realized by the shift pulse other than the clock pulse regenerated from the serial multiplexed coded data..

In the prior art frame alignment circuit, as discussed above, when the line numbers n increase, the size of the 1: n line demultiplexing circuit 2 (dividing counter circuit) and the decoder circuit 3 increase. Therefore it becomes burdensome to quickly demultiplex the high rate multiplexed coded signal due to the increased delay time which increases along with to the increasing of the size of the circuit.

It is a primary object of the present invention to provide a frame alignment circuit which demultiplexes the high speed multiplexed coded signal regardless of the number of demultiplexing line.

It is another object of the present invention to provide a frame alignment circuit in which shift operation is realized at a clock rate that is low relative to the rate of multiplexed coded signal.

It is a further object of the present invention to provide a frame alignment circuit having multiplexing circuits, wherein the frame synchronization is easily established by demultiplexing the high rate multi-coding signal even if the demultiplexing line numbers are increased.

SUMMARY OF THE INVENTION

The frame alignment circuit of the present invention comprises a first dividing counter for regenerating a first dividing clock by dividing the clock signal. The frame alignment circuit also includes a second dividing counter for dividing the first divided clock signal and for generating a second divided clock. The circuit further has a first shift register & latch circuit for shifting the multiplexed coded signal which is received from the transmission line, for latching the multiplexed coded signal and for generating n-parallel signals using the first divided clock. Still further, the circuit includes second shift resisters & latch circuits shifting the n-parallel signal output from the first shift register & latch circuit and for latching the n-parallel signal by the second divided clock and generating (n×m) parallel signal. Moreover, the circuit has a pattern detecting portion for detecting the frame pattern of said multiplexed coded signal and a framing portion for controlling the phase differences of the frame pattern detected by the pattern detecting portion and for generating shift pulses equal to the number of the phase differences by the second divided clock. Lastly, the circuit has a shift pulse width conversion circuit for converting the width of the second divided clock pulse to the width of the first divided clock pulse.

DETAILED DESCRIPTION OF THE PREFERRED EMBODIMENTS

Figure 1:
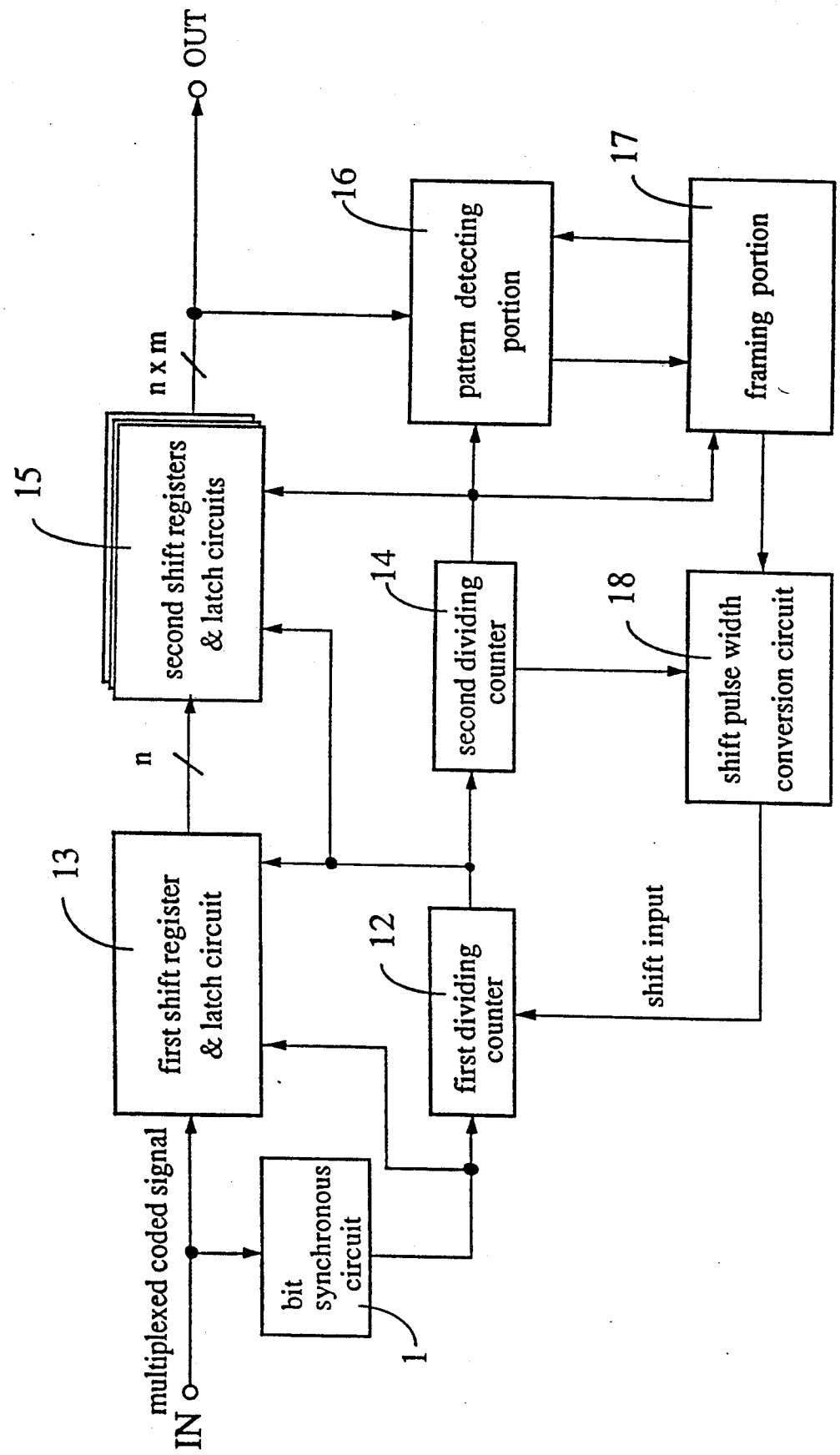
FIG. 1 is a block diagram of an embodiment of a frame alignment circuit of the present invention.

FIG. 1 is a block diagram of an embodiment of a frame alignment circuit in accordance with the present invention.

In FIG. 1, a bit synchronous circuit 1 regenerates a clock pulse from a multiplexed coded signal. A first dividing counter 12 regenerates a first dividing clock from the clock pulse. A shift register & latch circuit 13 shifts the multiplexed coded signal which is received from the transmission line and latches the multiplexed coded signal and generates n-parallel output signal by using the first divided clock signal generated in the first dividing counter 12.

A second dividing counter 14 divides the first divided clock signal by m to produce a second divided clock signal. Shift resisters & latch circuits 15 shift the n-parallel signals by the first divided clock signal, latch the n-parallel signals output in accordance with the second divided clock signal and generate (n×m) parallel signals as outputs. A pattern detecting portion 16 detects the frame pattern of the (n×m) parallel signals. A framing portion 17 controls the phase differences of the frame pattern detected by the pattern detecting portion 16 and generates a shift pulse which is equal to the number of the phase differences by using the second divided clock signal. The framing portion 17 contains, for example, a frame counter and a frame alignment circuit. A shift pulse width conversion circuit 18 converts the width of the second divided clock pulse to the width of the first divided pulse. The converted pulse is input to the first dividing counter 12.

Figure 2:
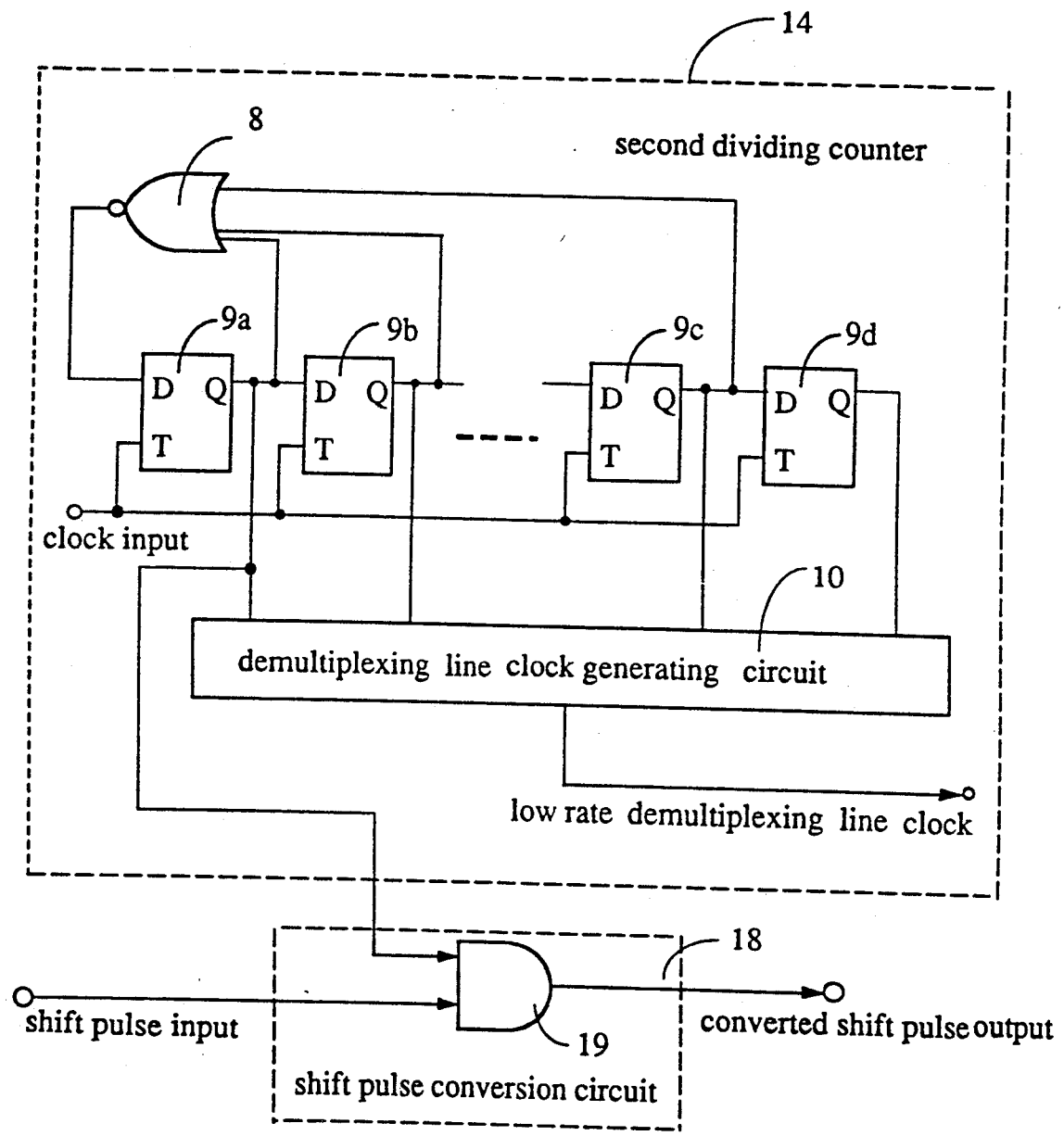
FIG. 2 shows a dividing counter of the circuit of FIG. 1.
Figure 3:
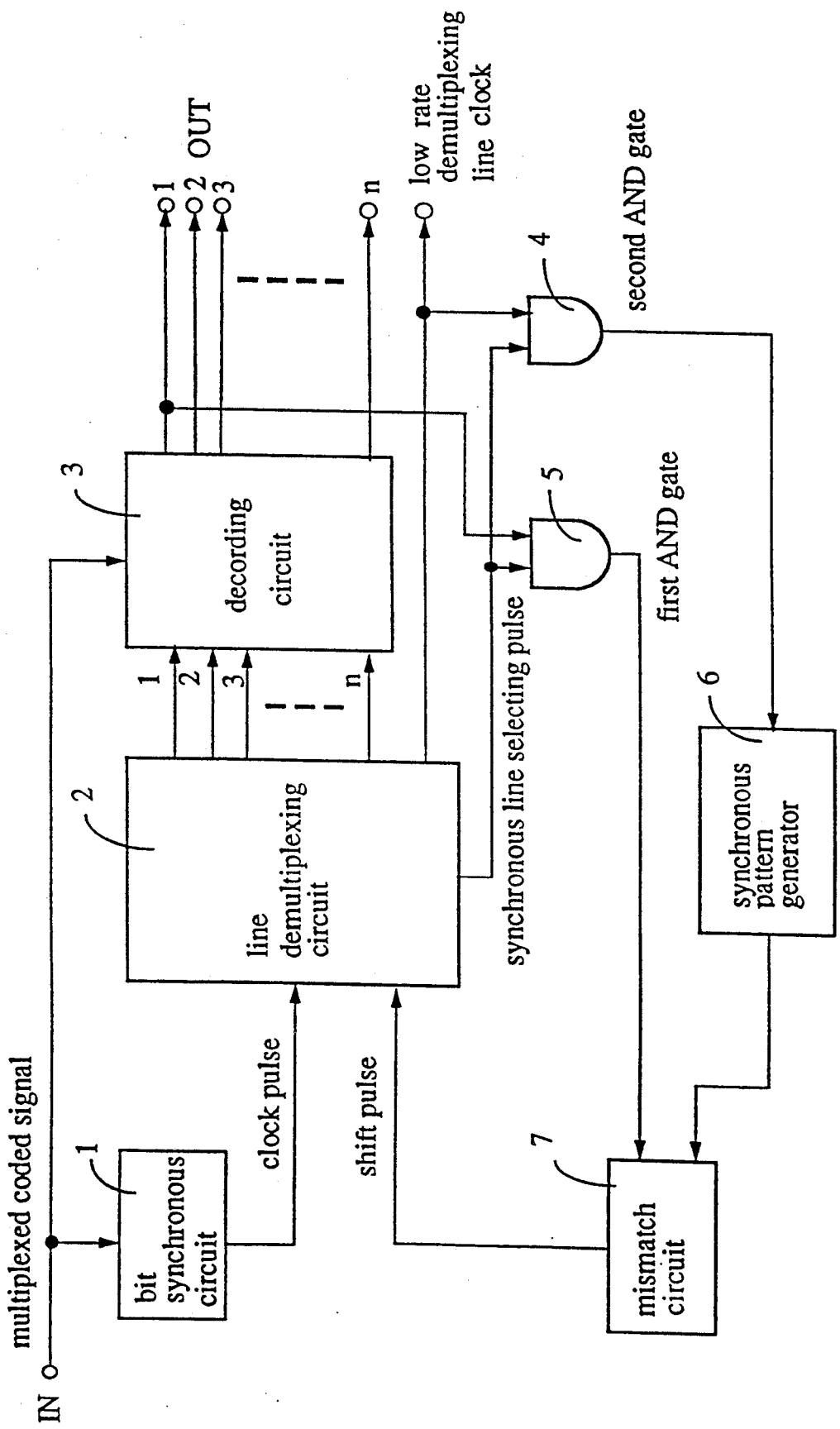
FIG. 3 shows a block diagram of a prior art frame alignment circuit.
Figure 4:
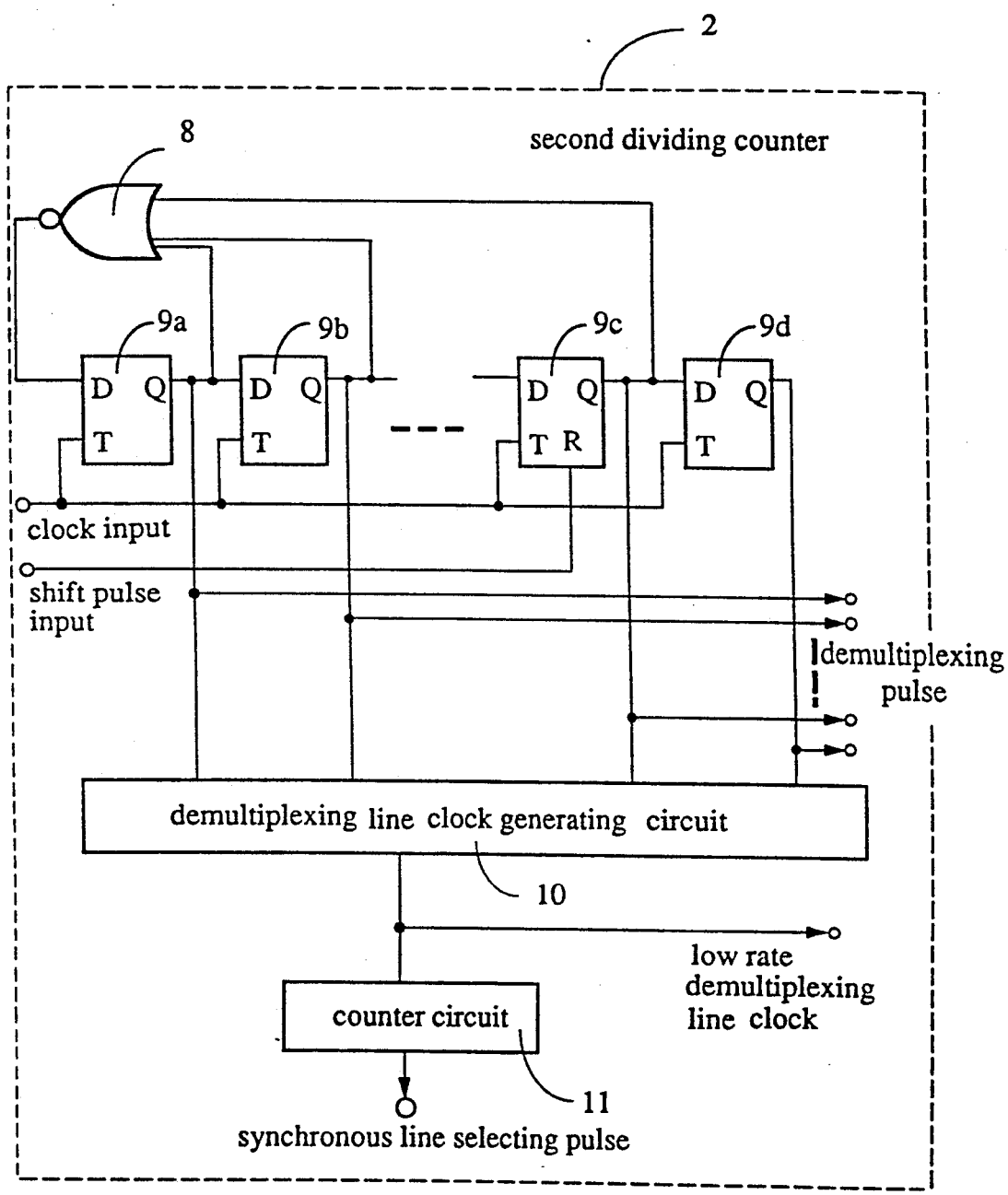
FIG. 4 shows a detail block diagram of a line demultiplexing circuit 2 of the prior art frame alignment circuit of FIG. 3.

FIG. 2 shows a detailed block diagram of the second dividing counter 14 and the shift pulse width conversion circuit 18 of FIG. 1. In FIG. 2, the second dividing counter 14 comprises, D flip-flops 9a-9d which are installed in the same number to the multiplexed lines and are connected in cascade fashion. NOR gate 8 has input terminals which are connected to the respective outputs of the D flip-flop 9a-9c. The output terminal of the NOR gate 8 is connected to a D terminal of the D flip-flop 9a. A demultiplexing line clock generating circuit 10 generates a low rate demultiplexing line clock signal using the output of the D flip-flops 9a-9d. The output of the first D flip-flops 9a are input to a shift pulse width conversion circuit 18. The shift pulse width conversion circuit 18 generates a converted shift pulse by multiplying the shift pulse and the output of the first D flip-flops 9a using an AND gate 19.

The operation of the present invention is explained hereinafter.

In FIG. 1, the multiplexed coded signal received from the transmission line is passed as inputs to the bit synchronous circuit 1. The bit synchronous circuit 1 regenerates a clock pulse. As described above, it is difficult for the dividing circuit to operate in high speed when the number of n input becomes large. In the present invention the dividing circuit is divided into two stages: the first dividing counter 12 and the second dividing counter 14.

A shift register & latch circuit 13 generates n-parallel signals by shifting the multiplexed coded signal and latching the multiplexed coded signal in accordance with the first divided clock received from the first dividing counter 12. Then, the n shift resisters & latch circuits 15 shift the n-parallel signals using the first divided clock signal to latch the n-parallel signals using the second divided clock and generate (n×m) signals as the outputs.

The outputs from the shift registers & latch circuits 15 are input to the pattern detecting portion 16. The pattern detecting portion 16 detects the frame pattern of the multiplexed coded signal. The results detected by the pattern detecting portion 16 are sent to the framing portion 17.

The framing portion 17 adjusts the timing of the detected frame pattern position by comparing with the inside frame counter (not shown). The framing portion 17 establishes synchronization by shifting the frame pattern forward or backward using well known synchronizing techniques.

If the above (n×m) output signals are not expanded to the parallel signals in a predetermined order, the framing portion 17 determines the number of pulses to be shifted. As the framing portion 17 is operated by the second divided clock signal, the pulse width of the output shift pulse is equal to that of the second divided pulse. The width of the shift pulse generated by the framing portion 17 is converted by multiplying the second divided clock signal and the shifted first divided clock signal in the shift pulse width conversion circuit 18.

The converted shift pulse, having the width of the first divided clock pulse, shifts the first divided clock in the first dividing counter 12 using a well known counter shift circuit. Accordingly the phase of the second divided pulse is shifted in the second dividing counter 14. As a result, the (n×m) output signal is obtained from the shift resisters & latch circuits 15.

In the above construction, the dividing counter is constructed in two stages, but may be constructed in more than two stages. In that case, the shift pulse width conversion circuit 18 is constructed in more than two stages.

In the present embodiment, the shift pulse width conversion circuit 18 is constructed by using AND gate, but it may be constructed by using another type of the circuit which converts the pulse width by detecting the edge of the shift pulse.

What is claimed is:

1. A frame alignment circuit, comprising:

first dividing counter means for dividing a clock signal and for generating a first divided clock signal;

second dividing counter means for dividing the first divided clock signal and for generating a second divided clock signal;

first shift register and latch circuit means, for accepting the first divided clock signal for accepting a multiplexed coded signal, for shifting the multiplexed coded signal by using the first divided clock signal, and for generating n-parallel signals;

second shift registers and latch circuits means for accepting the n-parallel signals, for shifting the n-parallel signals by using the second divided clock signal, and for generating (n×m) parallel signals;

pattern detecting means for accepting the second divided clock signal, for accepting the (n×m) parallel signals, for detecting a frame pattern, for determining a phase difference, and for generating a phase difference signal;

framing means for accepting the phase difference signal, for accepting the second divided clock signal and for generating shift pulses, each shift pulse having a width equal to the phase difference multiplied by the width of the second divided clock signal; and shift pulse width conversion circuit means for converting the shift pulse width to the width of the first divided clock signal.

2. A frame alignment circuit according to claim 1, wherein said second dividing counter means includes a plurality of D flip-flops.

3. A frame alignment circuit according to claim 2, wherein the second dividing counter includes a first D flip-flop generating an output pulse, and wherein said shift pulse width conversion circuit means includes means for multiplying the shift pulse with the output pulse of the first D flip-flop.

4. A frame alignment circuit according to claim 2, wherein said second dividing counter means includes a NOR gate, wherein each input of the NOR gate is connected to an output of a respective D flip-flop, said NOR gate having an output connected to an input of a first D flip-flop.

5. A frame alignment circuit according to claim 2, wherein said second dividing counter means further includes demultiplexing line clock generating circuit means for receiving an output of the D flip-flops and for generating a low rate demultiplexed line clock signal.

6. A frame alignment circuit according to claim 1, wherein said shift pulse width conversion circuit means includes means for detecting an edge of a first shift pulse.

7. A frame alignment circuit, comprising:
a first dividing counter, receiving and dividing a clock signal to generate a first divided clock signal;
a second dividing counter, receiving and dividing the first divided clock signal to generate a second divided clock signal;
a first shift register and latch circuit, receiving and shifting a multiplexed coded signal by using the first divided clock signal to generate n-parallel signals;
an assembly of second shift registers and second latch circuits, receiving the second divided clock signal, receiving the n-parallel signals, and shifting the n-parallel signals using the second divided clock signal to generate (n×m) parallel signals;

a pattern detecting circuit, receiving the (n×m) parallel signals, receiving the second divided clock signal, detecting a frame pattern, and determining a phase difference to generate a phase difference signal;

a framing circuit, using the phase difference signal and the second divided clock signal to generate a first number of first shift pulses, each first shift pulse having a width equal to the width of a pulse of the second divided clock signal, the first number corresponding to the phase difference; and a shift pulse width conversion circuit, converting the first number of first shift pulses to a corresponding greater number of second shift pulses, each second shift pulse having a width equal to the width of the first divided clock signal.

8. A frame alignment circuit according to claim 7, wherein said second dividing counter includes a plurality of D flip-flops.

9. A frame alignment circuit according to claim 8, wherein said second dividing counter includes a first D flip-flop, and wherein said shift pulse width conversion circuit generates the corresponding greater number of second shift pulses by multiplying the first number of first shift pulses with an output pulse of the first D flip-flop.

10. A frame alignment circuit according to claim 8, wherein said second dividing counter includes a NOR gate wherein each input of the NOR gate is connected to an output of a respective D flip-flop, said NOR gate having an output connected to an input of a first D flip-flop.

11. A frame alignment circuit according to claim 8, wherein said second dividing counter further includes a demultiplexing line clock generating circuit receiving an output of the D flip-flops and generating a low rate demultiplexed line clock signal.

12. A frame alignment circuit according to claim 7, wherein said shift pulse width conversion circuit detects an edge of a first shift pulse.

13. A method of frame alignment, comprising the steps of:
dividing a clock signal to generate a first divided clock signal;
dividing the first divided clock signal to generate a second divided clock signal;
accepting a multiplexed coded signal;
shifting and latching the multiplexed coded signal by using the first divided clock signal to generate n-parallel signals;
shifting and latching the n-parallel signals by using the first divided clock signal to generate (n×m) parallel signals;
analyzing the (n×m) parallel signals to detect a frame pattern, determine a phase difference, and generate a phase difference signal; and
using the phase difference signal to generate a first number of first shift pulses, each first shift pulse having a width equal to the width of a pulse of the second divided clock signal, the first number corresponding to the phase difference.

14. A method of frame alignment according to claim 13, further including the step of:
converting the first number of first shift pulses to a corresponding greater number of second shift pulses, each second shift pulse having a width equal to the width of the first divided clock signal.

* * * * *